(12) United States Patent
Miyazawa

(10) Patent No.: US 9,450,850 B2
(45) Date of Patent: *Sep. 20, 2016

(54) COMMUNICATION DEVICES, METHODS AND COMPUTER READABLE STORAGE MEDIA FOR DETERMINING A COMMUNICATION CONDITION AND COMMUNICATING WITH OTHER COMMUNICATION DEVICES

(75) Inventor: Jun Miyazawa, Chiryu (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 668 days.

This patent is subject to a terminal disclaimer.

(21) Appl. No.: 13/406,259

(22) Filed: Feb. 27, 2012

(65) Prior Publication Data

US 2012/0221737 A1    Aug. 30, 2012

(30) Foreign Application Priority Data

Feb. 28, 2011 (JP) ................. 2011-041317

(51) Int. Cl.
```
G06F 15/16      (2006.01)
H04L 12/26      (2006.01)
H04L 12/841     (2013.01)
H04L 12/24      (2006.01)
H04L 12/911     (2013.01)
```

(52) U.S. Cl.
CPC ....... *H04L 43/0894* (2013.01); *H04L 41/0896* (2013.01); *H04L 47/283* (2013.01); *H04L 47/822* (2013.01)

(58) Field of Classification Search
CPC .................................................. H04L 43/0894
USPC ....................................................... 709/228
See application file for complete search history.

(56) References Cited

U.S. PATENT DOCUMENTS

| | | | |
|---|---|---|---|
| 2006/0187942 A1* | 8/2006 | Mizutani et al. | 370/401 |
| 2008/0219164 A1* | 9/2008 | Shimonishi | 370/235 |
| 2012/0201255 A1* | 8/2012 | Manor et al. | 370/468 |
| 2013/0114408 A1* | 5/2013 | Sastry | H04W 28/02 370/231 |
| 2013/0258865 A1* | 10/2013 | Kovvali | H04W 24/10 370/241 |

FOREIGN PATENT DOCUMENTS

JP        4367505 B2    11/2009

\* cited by examiner

*Primary Examiner* — Hitesh Patel
(74) *Attorney, Agent, or Firm* — Baker Botts L.L.P.

(57) ABSTRACT

A communication device including a controller that controls the communication device to execute steps of: establishing a first communication session between the communication device and a first communication device; determining whether a second communication session between the first communication device and a second communication device is established; acquiring a communication parameter of the second communication session from the first communication device when the controller determines that the second communication session between the first communication device and the second communication device is established; and determining a bandwidth of the first communication session based on the acquired communication parameter of the second communication session.

8 Claims, 11 Drawing Sheets

COMMUNICATION DEVICES, METHODS AND COMPUTER READABLE STORAGE MEDIA FOR DETERMINING A COMMUNICATION CONDITION AND COMMUNICATING WITH OTHER COMMUNICATION DEVICES

CROSS-REFERENCE TO RELATED APPLICATION

This application claims priority from Japanese Patent Application No. 2011-041317 filed on Feb. 28, 2011, which is incorporated herein by reference.

BACKGROUND OF THE INVENTION

1. Field of the Invention

The present invention relates generally to communication devices, communication methods, and computer readable storage medium that executes instructions to determine a communication condition and to communicate with other communication device via a network based on a measured network status.

2. Description of Related Art

A known communication device has a function for measuring a status of a network. The known communication device transmits a plurality of measurement packets to another communication device. A period of time from the transmission of the measurement packet to reception of an acknowledgement (ACK) packet is measured as a round trip time. Based on the measured round trip time, an optimum transmission bandwidth is determined. The known communication device communicates via the network by transmitting the data packets using the determined transmission band.

SUMMARY OF THE INVENTION

When communication of data packets is implemented among a plurality of communication devices, a known communication device of the plurality of communication device starts to communicate with a new communication device. The known communication device transmits a plurality of measurement packets to the new communication devices in order to measure the status of the network between the known communication device and the new communication device. Nevertheless, the transmitted measurement packets occupy a certain portion of the bandwidth of the network. Accordingly, the communication of the measurement packets may interfere with other communication of data packets implemented among the plurality of communication device.

A need has arisen for communication device, communication methods, and computer readable storage media containing computer-readable instructions for measuring a status of a network while avoiding interference with the communication of other data packets being implemented among the plurality of communication devices.

According to an embodiment of the present invention, a communication device comprising: a controller configured to control the communication device to execute steps of: establishing a first communication session between the communication device and a first communication device; determining whether a second communication session between the first communication device and a second communication device is established; acquiring a communication parameter of the second communication session from the first communication device when the controller determines that the second communication session between the first communication device and the second communication device is established; and determining a bandwidth of the first communication session based on the acquired communication parameter of the second communication session.

According to another embodiment of the present invention, a method for implementing communication at a communication device, the method comprising steps of: establishing a first communication session between the communication device and a first communication device; determining whether a second communication session between the first communication device and a second communication device is established; acquiring a communication parameter of the second communication session from the first communication device when the second communication session between the first communication device and the second communication device is established; and determining a bandwidth of the first communication session based on the acquired communication parameter of the second communication session.

According to still another embodiment of the present invention, a non-transitory computer readable storage medium storing computer readable instructions that, when executed, cause a communication device to execute steps of: establishing a first communication session between the communication device and a first communication device; determining whether a second communication session between the first communication device and a second communication device is established; acquiring a communication parameter of the second communication session from the first communication device when the second communication session between the first communication device and the second communication device is established; and determining a bandwidth of the first communication session based on the acquired communication parameter of the second communication session.

Other objects, features, and advantages of an embodiment of the invention will be apparent to persons of ordinary skill in the art from the following description of an embodiment with reference to the accompanying drawings.

BRIEF DESCRIPTION OF THE DRAWINGS

For a more complete understanding of the present invention, needs satisfied thereby, and the objects features, and advantages thereof, reference now is made to the following descriptions taken in connection with the accompanying drawings.

DETAILED DESCRIPTION OF EMBODIMENTS OF THE INVENTION

Figure 1:
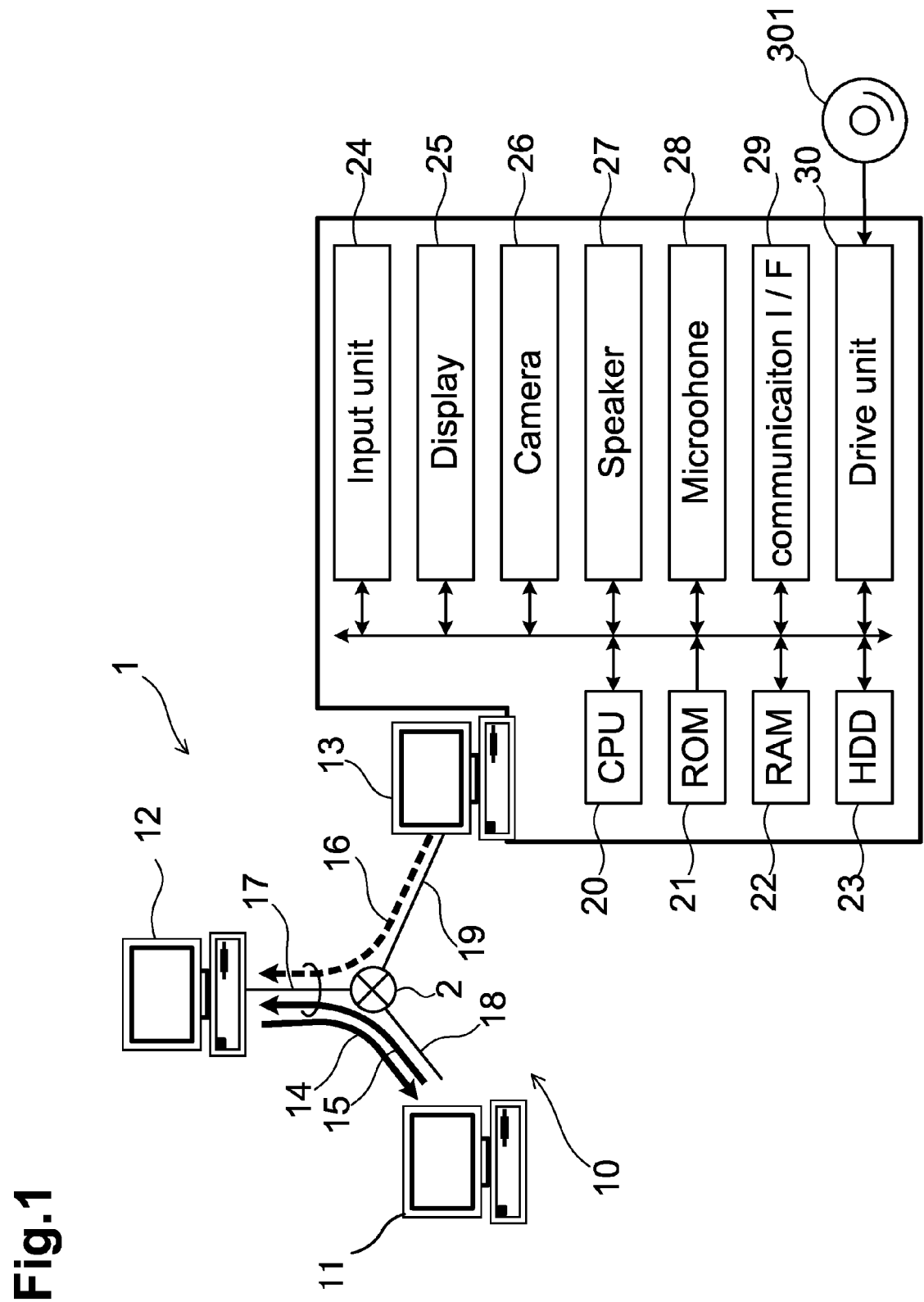
FIG. 1 is a block diagram depicting a communication system and an electrical configuration of a communication device according to an embodiment of the invention.

Embodiments of the invention now are described in detail with reference to the accompanying drawings, like reference numerals being used for like corresponding parts in the various drawings.

Referring to FIG. 1, a communication system 1 may comprise a plurality of communication terminals 10. The plurality of communication terminals 10 may comprise communication terminals 11, 12, and 13. The plurality of communication terminals 10 may perform the peer-to-peer (P2P) type communication with each other over a network 2 to hold a videoconference. Each of the plurality of communication terminals 10 may be a personal computer (PC) or a terminal configured for videoconference. Reference numerals, e.g., 11, 12, and 13, labeling each of the plurality of communication terminals 10 may also represent the IDs of the respective communication terminals 10. The communication device 13 may comprise a CPU 20 that controls the communication device 13. The CPU 20 may be electrically connected to a ROM21, a RAM 22, a hard disk drive (HDD) 23, an input unit 24, a display 25, a camera 26, a speaker 27, a microphone 28, a communication I/F 29, and a driver unit 30. The ROM 21 stores a boot program, a basic input/output system (BIOS), an operation system (OS), and so forth. The RAM 22 may store temporary data such as a timer value or a counter value. The HDD 23 may store therein a communication program of the CPU 20. The input unit 24 may be a keyboard, a mouse, a combination thereof, or other similar devices, by which a user may input instructions. The communication I/F 29 may control a timing at which the communication device 10 communicates with another communication device 10 via the network 2. The driver unit 30 may be configured to read information stored in a storage medium 301.

The storage medium 301 may be a storage medium, such as a digital versatile disc (DVD). For example, when each of the communication device 10 is set up, a communication program stored in the storage medium 301 may be read by the driver unit 30 and may be stored in the HDD 23. The communication program may be downloaded from a predetermined server through the network 2 for storage in the HDD 23. The communication device 10 may determine an available amount of the communication data in the network 2. The available amount of the communication data may represent a communication capacity in the network 2 available for data communication.

The communication device 10 may control the transmission speed of the packet within the determined available amount of communication data, such that the available amount of communication data may be efficiently utilize. The available amount of communication data may be referred to as bandwidth. The available amount of communication data may be referred to as available bandwidth. The transmission speed of the packet may be referred to as transmission bandwidth, and the reception speed of the packet may be referred to as reception bandwidth.

Figure 2:
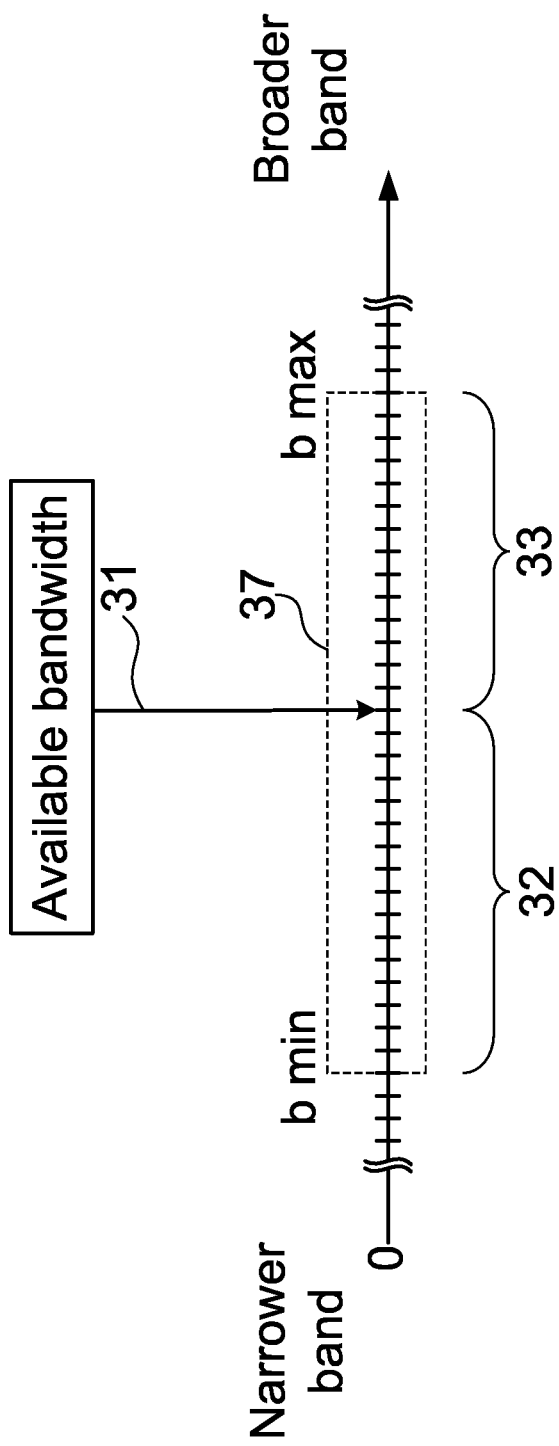
FIG. 2 is a diagram for explaining a measurement method of an available bandwidth according to an embodiment of the invention.

Referring to FIG. 2, the communication device 10 may implement a measurement method of the available bandwidth. The communication device 10 may transmit a plurality of measurement packets to other communication device via the network 2. The other communication device may receive the plurality of measurement packets transmitted from the communication device 10. The communication device 10 that transmits the measurement packet may be referred to as transmitting device. The communication device 10 that receives the measurement packet may be referred to as receiving device. The measurement packet may be a data packet transmitted for the purpose of measuring the status of the network. The status of the network may be represented, for example, by an available bandwidth of the network. The horizontal axis in FIG. 2 may represent an absolute value of the bandwidth. The left end of the horizontal axis in FIG. 2 may correspond to the bandwidth of "0." The less the value of the horizontal axis in FIG. 2 is, the narrower the bandwidth may be.

On the contrary, the greater that the value measured on the horizontal axis in FIG. 2 is, the broader the bandwidth may be. In FIG. 2, the portion where the bandwidth is narrow may be represented by a "narrow band," and the portion where the bandwidth is broad may be represented by a "broad band." The available bandwidth, e.g., bit per second (bps), of the communication device 10 may be represented by an available bandwidth 31. When the transmission bandwidth (bps) at which the transmitting device transmits the measurement packet is equal to or narrower than the available bandwidth 31, the transmission bandwidth may be located in a region 32 in FIG. 2. When the transmission bandwidth is in the region 32, a variation of a ratio between the number of measurement packets that the receiving device is unable to receive and the number of measurement packets transmitted by the transmitting device may be reduced. When the transmission bandwidth is in the region 32, variation of the measurement packet between the transmission bandwidth and the reception bandwidth may be a reduced. The ratio between the number of measurement packets that the receiving device is unable to receive and the number of measurement packets transmitted by the transmitting device may be referred to as packet loss. The variation of the measurement packet between the transmission bandwidth and the reception bandwidth may be referred to as jitter. When the transmission bandwidth at which the transmitting device transmits the measurement packet is broader than the available bandwidth, the transmission bandwidth may be located in a region 33 in FIG. 2. When the transmission bandwidth is located in the region 33, the packet loss and the jitter may increase.

The transmitting device may control the transmission interval of the measurement packet within a predetermined range of the bandwidth. More specifically, the transmitting device may gradually vary the transmission interval from the broader side to the narrower side, within the predetermined range. The broader side may correspond to a reduced transmission interval. The narrower side may correspond to a increased transmission interval. The predetermined bandwidth range may be referred to as predetermined range 37, as shown in FIG. 2. The transmitting device may vary the transmission bandwidth from a bandwidth bmax which may be the upper limit of the predetermined range 37 to a bandwidth bmin which may be the lower limit thereof. The predetermined range 37 may be determined in advance, such that the predetermined range 37 may cover a bandwidth that includes the available bandwidth. When the transmission bandwidth of the measurement packet is broader than the available bandwidth, e.g., region 33, the packet loss and the jitter may increase. When the transmission bandwidth of the measurement packet becomes narrower than the available bandwidth, e.g., region 32, the packet loss and the jitter may decrease.

The receiving device may measure the packet loss and the jitter when receiving the measurement packet transmitted from the transmitting device. When the measured packet loss and jitter are less than a predetermined threshold, the receiving device may determine that the reception bandwidth of the measurement packet as the available bandwidth in a communication line directed from the transmitting device to the receiving device. The above-mentioned communication executed for the purpose of measuring the available bandwidth may be referred to as measurement communication. The available bandwidth determined by the receiving device may be notified to the transmitting device. The transmitting device then may control or adjust the transmission bandwidth within a range of the notified available bandwidth. The transmitting device then may transmit a data packet to the receiving device. Thus, communication in a network environment in which the packet loss and the jitter are reduced may be performed. The transmitting device may stably perform the communication with the receiving device to carry out the video conference.

The measured packet loss and jitter may be less than the predetermined threshold when the receiving device receives a measurement packet transmitted at the transmission bandwidth of bmax. In this case, the available bandwidth may be located on the broader side from the predetermined range 37. The receiving device may utilize a bandwidth on the broader side from the predetermined range 37 for communication with the transmitting device and may request the transmitting device to transmit the measurement packets. The transmitting device may transmit the measurement packets while gradually varying the transmission bandwidth toward the broader side from bmax. Thus, the receiving device may determine the available bandwidth, even though the available bandwidth is broader than the predetermined range 37.

In another embodiment, the communication device 13 may transmit the measurement packets while gradually varying the transmission bandwidth from the lower limit bmin of the predetermined range 37 to the upper limit thereof. In still another embodiment, the communication device 13 may randomly select the transmission bandwidth from within the predetermined range 37 for transmitting the measurement packets.

A communication may be executed between the communication devices 11 and 12 as indicated by arrows 14, 15 in FIG. 1. The communication device 13 may request to start communication to the communication device 12, e.g., arrow 16. In order to determine the transmission bandwidth for transmitting a data packet to the communication device 12, the communication device 13 may measure the available bandwidth in the communication line directed from the communication device 13 to the communication device 12. Nevertheless, a part of the bandwidth in the communication line directed from the communication device 13 to the communication device 12, e.g., communication line 17, has already been occupied with the communication directed from the communication device 11 to the communication device 12, e.g., arrow 15. The communication line directed from the communication device 11 to the communication device 12 and the communication line directed from the communication device 13 to the communication device 12 may overlap in the communication line 17. Consequently, when the measurement packets are transmitted from the communication device 13 to the communication device 12, an occupation rate of the bandwidth of the communication line 17 may increase. The increase in occupation rate of the bandwidth in the communication line 17 may adversely affect the communication between the communication devices 11 and 12. Further, the accuracy of the measurement of the available bandwidth in the communication line directed from the communication device 13 to the communication device 12 may degrade.

In order to prevent the above-mentioned adverse effect, when a communication between the devices 11 and 12 is executed and the communication device 13 starts to communicate with the communication device 12, the communication device 13 may determine the transmission bandwidth of the measurement packet to be transmitted first.

Figure 3:
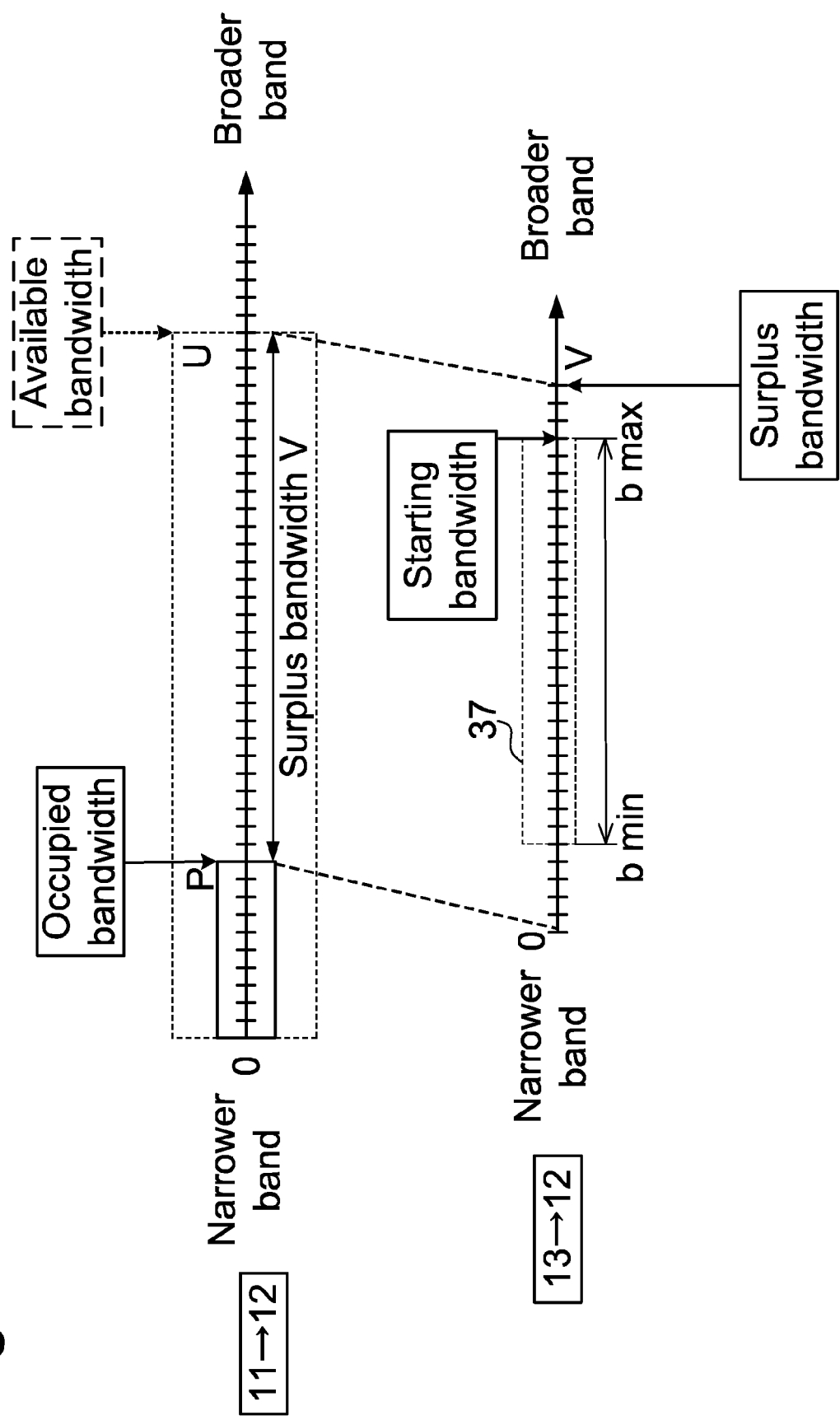
FIG. 3 is a diagram for explaining a determination method of a transmission band according to an embodiment of the invention.

Referring to FIGS. 3-6, a method of determining the transmission bandwidth of the measurement packet to be transmitted first is described. An available bandwidth U shown in FIG. 3 may represent the available bandwidth in the communication line directed from the communication device 11 to the communication device 12. An occupied bandwidth P shown in FIG. 3 may represent the bandwidth occupied for the communication from the communication device 11 to the communication device 12. In FIG. 3, the occupied bandwidth P in the available bandwidth U may be occupied for the communication from the communication device 11 to the communication device 12. The bandwidth occupied for the communication from the communication device 11 to the communication device 12 may be referred to as occupied bandwidth. The occupied bandwidth P may coincide with the transmission bandwidth of the data packet being transmitted from the communication device 11 to the communication device 12.

The communication device 13 may determine the transmission bandwidth of the measurement packet as follows. First, the communication device 13 may acquire the available bandwidth U from the communication device 12. The communication device 13 also may acquire, from the communication device 12, the transmission bandwidth of the data packet being transmitted from the communication device 11 to the communication device 12. The acquired transmission bandwidth may correspond to the occupied bandwidth P. The communication device 13 then may subtract the occupied bandwidth P from the available bandwidth U to obtain a bandwidth V. The bandwidth V may represent the unused portion of the available bandwidth U. Hereinafter, the bandwidth obtained by subtracting the occupied bandwidth from the available bandwidth may be referred to as surplus bandwidth. While the transmission bandwidth, at which the communication device 13 transmits the measurement packets, does not exceed the surplus bandwidth V, the communication from the communication device 11 to the communication device 12 may not be adversely affected by the measurement communication.

The communication device 13 may compare the upper limit bmax and lower limit bmin of the predetermined range 37 to be used as the transmission bandwidth for the measurement communication, with the surplus bandwidth V. Through such comparison, the communication device 13 may decide whether it is possible to utilize the predetermined range 37 to determine the transmission bandwidth and to perform the measurement communication. As shown in FIG. 3, the surplus bandwidth V is greater than bmax. Accordingly, while the transmission bandwidth is set within the predetermined range 37, the transmission bandwidth may be less than the surplus bandwidth V. Even if any bandwidth within the predetermined range 37 is used as the transmission bandwidth of the measurement packets, it may not adversely affect the communication from the communication device 11 to the communication device 12. Thus, the communication device 13 may decide that it is possible to utilize the predetermined range 37 to determine the transmission bandwidth, and to perform the measurement communication. The communication device 13 may select bmax as the transmission bandwidth of the measurement packet to be transmitted first. Hereinafter, the transmission bandwidth of the measurement packet to be transmitted first may be referred to as starting bandwidth.

The communication device 13 may vary the transmission bandwidth in the range from bmax to bmin for transmission of the measurement packets to the communication device 12. The communication device 12 may receive the measurement packets and measure the packet loss and the jitter to determine the available bandwidth in the predetermined range 37. The communication device 12 then may notify the determined available bandwidth to the communication device 13. The communication device 13 may adjust the transmission bandwidth for communication with the communication device 12 within a range that does not exceed the available bandwidth that has been notified.

Although the communication device 12 may receive the measurement packet at the transmission bandwidth of bmax, the communication device 12 may decide that the available bandwidth is located on the broader side from the bmax. Although the surplus bandwidth V may represent the unused portion of the available bandwidth U in the foregoing calculation, the unused portion of the available bandwidth in the transmission line 17 shown in FIG. 1 may be taken as the surplus bandwidth V. In this case, the surplus bandwidth V may correspond to a portion, e.g., transmission line 18 in FIG. 1, that does not overlap with the communication line from the communication device 13 to the communication device 12, e.g., transmission line 17 in FIG. 1, in the communication line from the device 11 to the communication device 12. Thus, the surplus bandwidth V may correspond to the unused portion of the overlapping portion of the communication line. Accordingly, when the communication line from the communication device 13 to the communication device 12, e.g., transmission lines 17 and 19 in FIG. 1, has sufficient bandwidth, the available bandwidth may exceed the surplus bandwidth V. In such a case, the communication device 12 may decide that the available bandwidth is located on the broader side from the bmax.

When deciding that the available bandwidth is located on the broader side from bmax, the communication device 12 may request the communication device 13 to transmit the measurement packets using the bandwidth on the broader side from bmax. The communication device 13 then may select the transmission bandwidth from the range broader than bmax, in response to request from the communication device 12, and may transmit the measurement packets. Thus, the communication device 12 may determine the available bandwidth located on the broader side from bmax.

As described above, the communication device 13 may set bmax as the starting bandwidth in the case where bmax is less than the surplus bandwidth V. When bmax is utilized as the transmission bandwidth, the unused portion of the bandwidth of the transmission line may be utilized. Accordingly, the communication currently being performed between the communication devices 11 and 12 may not be adversely affected by the measurement communication.

Further, because the communication device 13 utilizes the unused portion of the bandwidth of the communication line for the measurement communication, the available bandwidth of the communication line for communication with the communication device 12 may be accurately measured. In addition, the available bandwidth may be located in the predetermined range 37. Therefore, the communication device 13 may quickly measure the available bandwidth by transmitting the measurement packets utilizing the predetermined range 37.

Figure 4:
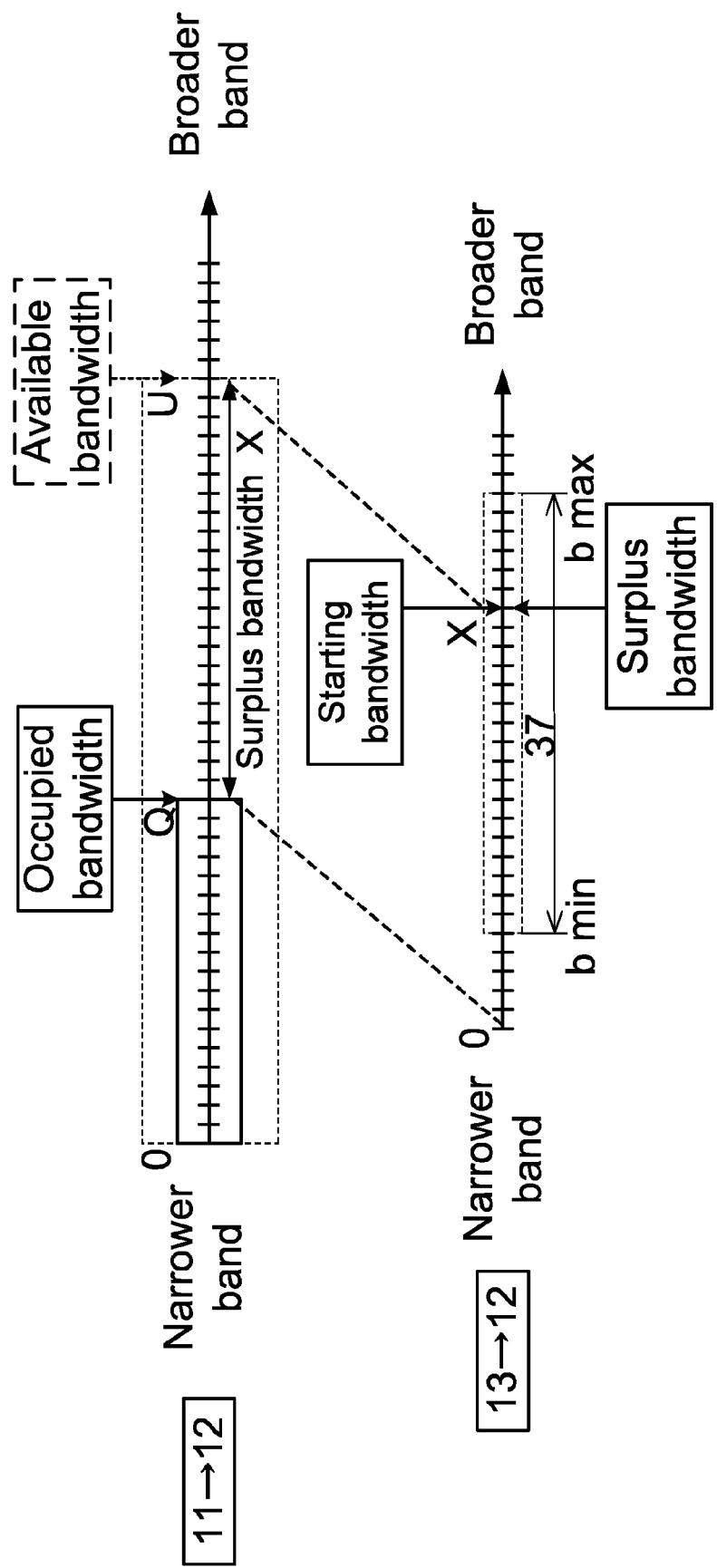
FIG. 4 is another diagram for explaining the determination method of the transmission band according to an embodiment of the invention.

A greater amount of data packets than the ones shown in FIG. 3 may be transmitted from the communication device 11 to the communication device 12. As shown in FIG. 4, the communication from the communication device 11 to the communication device 12 may utilize an occupied bandwidth Q within the available bandwidth U. The occupied bandwidth Q may be greater than the occupied bandwidth P in FIG. 3. The communication device 13 may acquire the available bandwidth U from the communication device 12. The communication device 13 also may acquire from the communication device 12 the transmission bandwidth of the data packets being transmitted from the communication device 11 to the communication device 12, as the occupied bandwidth Q. The communication device 13 then may subtract the occupied bandwidth Q from the available bandwidth U to obtain a surplus bandwidth X.

The communication device 13 may compare the upper limit bmax and lower limit bmin of the predetermined range 37 with the surplus bandwidth X. As shown in FIG. 4, the surplus bandwidth X may be smaller than bmax and greater than bmin. Accordingly, a bandwidth in the predetermined range 37 on the broader side from the surplus bandwidth X may be utilized as the transmission bandwidth of the measurement packet. In this case, however, the communication from the communication device 11 to the communication device 12 may be affected by the measurement communication. Thus, the bandwidth in the transmission line utilized for the communication from the communication device 11 to the communication device 12 may exceed the available bandwidth U by transmitting of the measurement packets.

Accordingly, the communication device 13 may select the surplus bandwidth X as the starting bandwidth to prioritize usage of the bandwidth in the predetermined range 37 less than the surplus bandwidth X with priority. The communication device 13 may vary the transmission bandwidth in the range from the surplus bandwidth X to bmin for transmission of the measurement packets to the communication device 12. The communication device 12 may receive the measurement packets and determine the available bandwidth. The communication device 12 then may notify the determined available bandwidth to the communication device 13. The communication device 13 then may adjust the transmission bandwidth for communication with the communication device 12, such that the transmission bandwidth is within a range that does not exceed the available bandwidth that has been notified.

The communication device 13 may set the surplus bandwidth X as the starting bandwidth when the surplus bandwidth X is less than bmax and greater than bmin. In this case, the bandwidth less than the surplus bandwidth X may be utilized with priority as the transmission bandwidth. When the bandwidth less than the surplus bandwidth X is utilized as the transmission bandwidth, the unused portion of the bandwidth of the transmission line may be utilized. Accordingly, the communication currently performed between the communication devicees 11 and 12 may not be adversely affected by the measurement communication. Further, because the communication device 13 utilizes the unused portion of the bandwidth of the communication line for the measurement communication, the available bandwidth of the transmission line for communication with the communication device 12 may be more accurately measured. In addition, the communication device 13 may quickly measure the available bandwidth, because the transmission bandwidth is selected from a range narrower than the predetermined range 37.

Figure 5:
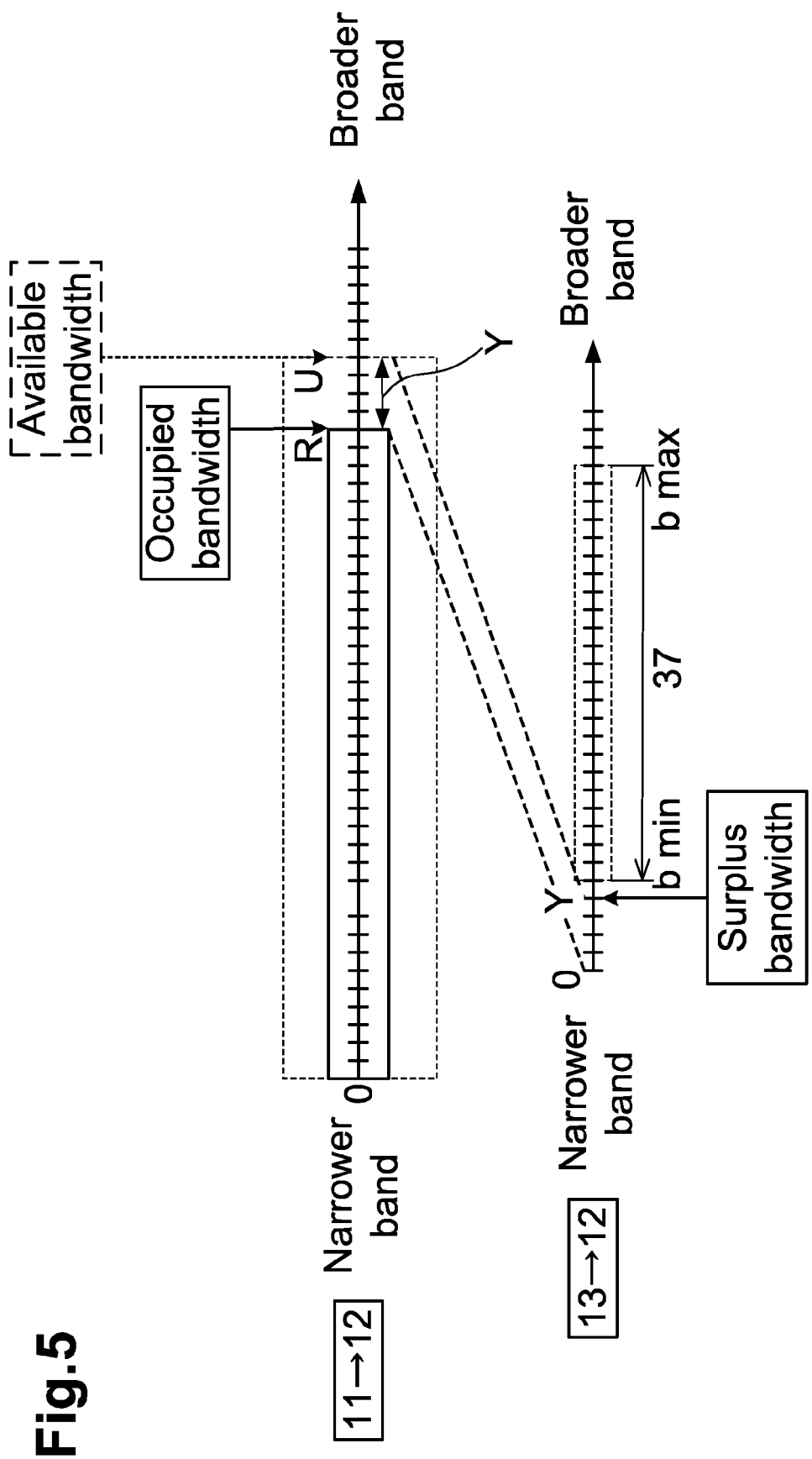
FIG. 5 is still another diagram for explaining the determination method of the transmission band according to an embodiment of the invention.

A greater amount of data packets than the one shown in FIG. 4 may be transmitted from the communication device 11 to the communication device 12. As shown in FIG. 5, the communication from the communication device 11 to the communication device 12 may utilize an occupied bandwidth R within the available bandwidth U. The occupied bandwidth R may be greater than the occupied bandwidth Q in FIG. 4. The communication device 13 may acquire the available bandwidth U from the communication device 12. The communication device 13 also may acquire, from the communication device 12, the transmission bandwidth of the data packets transmitted from the communication device 11 to the communication device 12, as the occupied bandwidth R. The communication device 13 then may subtract the occupied bandwidth R from the available bandwidth U to obtain a surplus bandwidth Y.

The communication device 13 may compare the upper limit bmax and lower limit bmin of the predetermined range 37 with the surplus bandwidth Y. As shown in FIG. 5, the surplus bandwidth Y may be less than bmin. Accordingly, when a bandwidth in the predetermined range 37 is utilized as the transmission bandwidth of the measurement packets, the communication from the communication device 11 to the communication device 12 may be adversely affected by the measurement communication. Thus, the bandwidth in the transmission line utilized for the communication from the communication device 11 to the communication device 12 may exceed the available bandwidth U by transmitting the transmission of the measurement packets. Further, because the surplus bandwidth Y is reduced, the bandwidth available for transmitting the measurement packet may be limited, which may lead to failure in detecting the available bandwidth.

Accordingly, the communication device 13 may request the communication device 11 to suppress the use of the transmission bandwidth for transmission of the data packets from the communication device 11 to the communication device 12. In accordance with such a request from the communication device 13, the communication device 11 may suppress the use of the transmission bandwidth for transmission of the data packets to the communication device 12.

Figure 6:
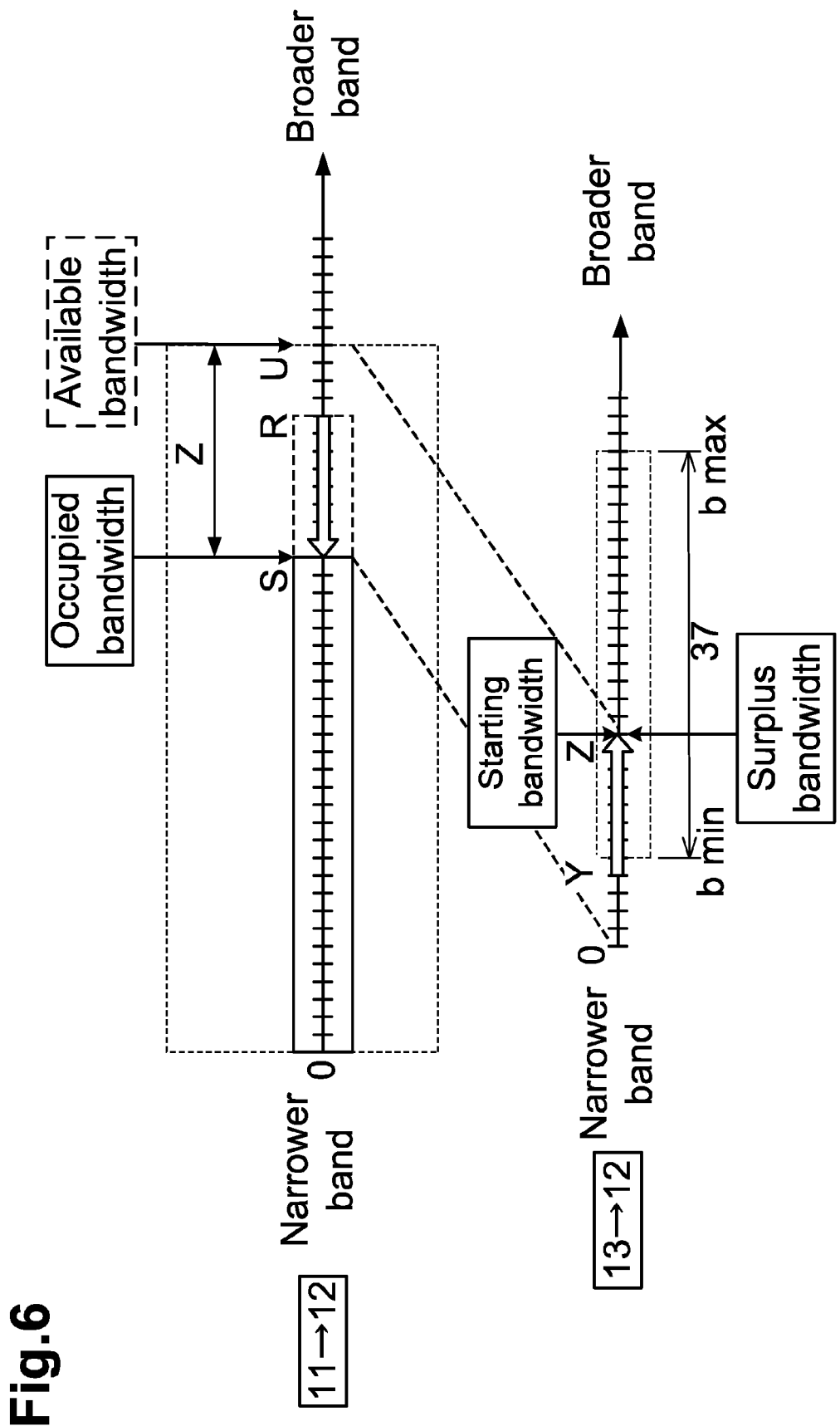
FIG. 6 is yet another diagram for explaining the determination method of the transmission band according to an embodiment of the invention.

Because of such operation of the communication device 11, the bandwidth occupied for the communication from the communication device 11 to the communication device 12 may decrease from the bandwidth R to a bandwidth S, as shown in FIG. 6. The communication device 13 again may acquire from the communication device 12 the transmission bandwidth of the data packets being transmitted from the communication device 11 to the communication device 12. The acquired transmission bandwidth may correspond to the occupied bandwidth S. The communication device 13 may subtract the occupied bandwidth S from the available bandwidth U to obtain a surplus bandwidth Z. The surplus bandwidth Z may be greater than the surplus bandwidth Y.

The communication device 13 may compare the upper limit bmax and lower limit bmin of the predetermined range 37 with the surplus bandwidth Z. As shown in FIG. 6, the surplus bandwidth Z may be less than bmax and greater than bmin. Accordingly, the communication device 13 may select the surplus bandwidth Z as the starting bandwidth, such that the bandwidth in the predetermined range 37 less than the surplus bandwidth Z may be used with priority, as shown FIG. 4. The communication device 13 may vary the transmission bandwidth in the range from the surplus bandwidth Z to bmin, for transmission of the measurement packets to the communication device 12. The communication device 12 may receive the measurement packets and determine the available bandwidth. The communication device 12 then may notify the determined available bandwidth to the communication device 13. The communication device 13 then may adjust the transmission bandwidth for communication with the communication device 12, such that the transmission bandwidth is within a range that does not exceed the available bandwidth that has been notified.

When the surplus bandwidth Z is greater than bmax after comparing the upper limit bmax and lower limit bmin of the predetermined range 37 with the surplus bandwidth Z, the communication device 13 may decide that it is possible to utilize the predetermined range 37 to determine the transmission bandwidth and to perform the measurement communication. The communication device 13 then may select bmax as the starting bandwidth, as shown in FIG. 3, and may vary the transmission bandwidth in the range between bmax and bmin for transmission of the measurement packets to the communication device 12.

As described above, the communication device 13 may cause the communication device 11 to suppress the use of the transmission bandwidth for transmission of the data packets from the communication device 11 to the communication device 12, when the surplus bandwidth Y is less than bmin. Accordingly, the surplus bandwidth Z may become exceed the surplus bandwidth Y. Therefore the communication device 13 may vary the transmission bandwidth in a wider range for transmission of the measurement packets. Such an operation ensures that the available bandwidth may be determined successfully. Further, because bandwidth less than the surplus bandwidth Z is utilized as the transmission bandwidth, the communication currently performed between the communication devices 11 and 12 may not be adversely affected by the measurement communication. In addition, because the communication device 13 utilizes the unused portion of the bandwidth of the transmission line for the measurement communication, the available bandwidth of the communication line for communication with the communication device 12 may be accurately measured.

FIGS. 7-11 depict a main procedure that may be performed by the CPU 20 of the communication device 10. The main procedure may be activated and executed by the CPU 20 when a user inputs an instruction to initiate a session with another communication device 10. The main procedure may be executed by the CPU 20 of the communication device 13 in the communication system 1, as shown in FIG. 1. In FIG. 1, a session between the communication device 11 and the communication device 12 may already be established and communication may be performed between the communication devices 11 and 12, as depicted by an arrow 15 in FIG. 1. The communication device 13 may attempt to establish a session with the communication device 12 so as to initiate communication therewith, as depicted by arrow 16 in FIG. 1.

Figure 7:
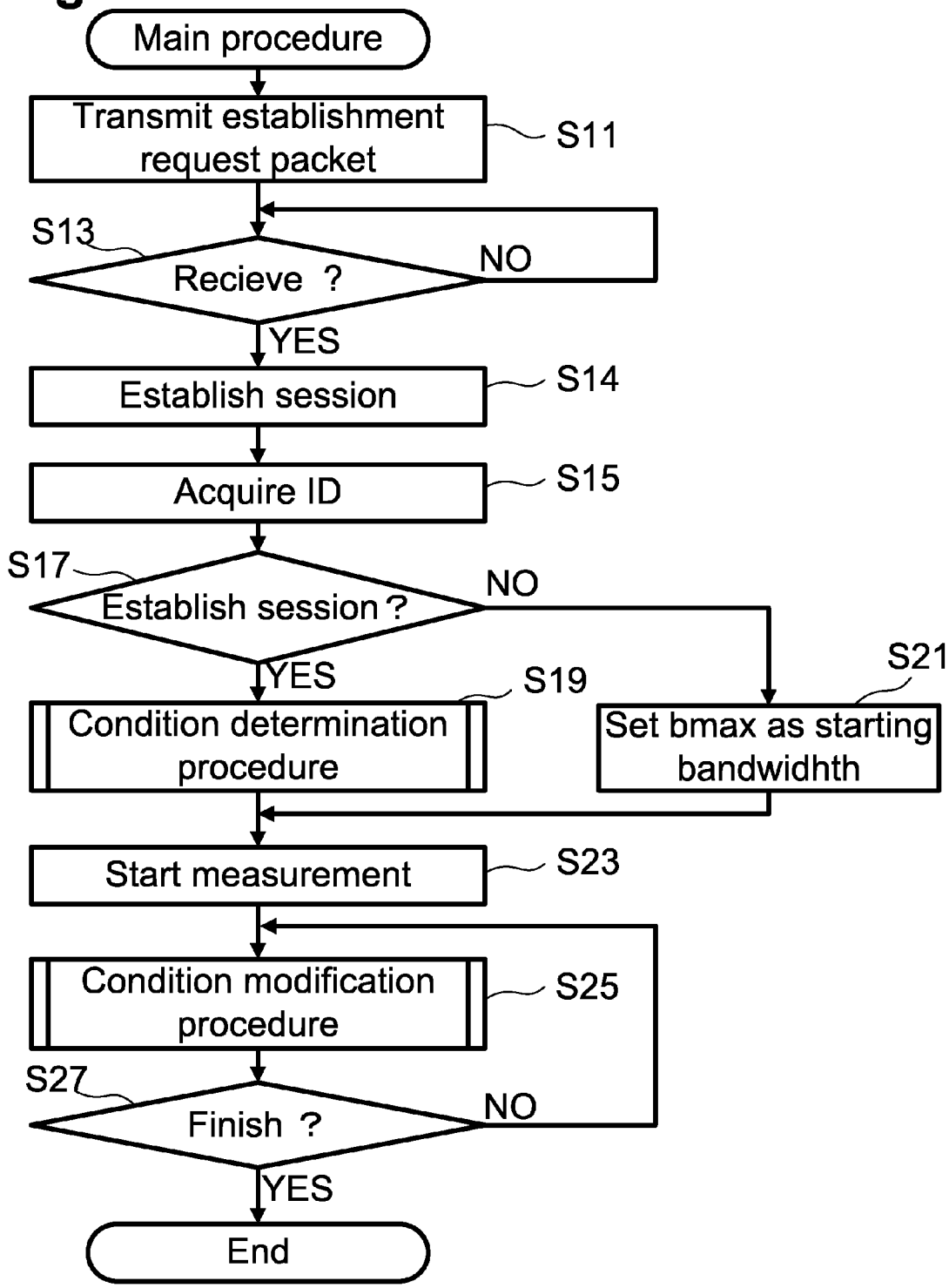
FIG. 7 is a flowchart depicting a main procedure according to an embodiment of the invention.

The user of the communication device 13 may input the instruction to initiate a session with the communication device 12 through the input unit 24. This operation may activate the main procedure. As shown in FIG. 7, an establishment request packet may be transmitted to the communication device 12 at step S11. The establishment request packet may be a packet for requesting initiation of a session. The communication device 12 may receive the establishment request packet. The user of the communication device 12 may decide whether to approve the initiation of a session with the communication device 13 and may input the decision through the input unit 24. When the approval for initiation of a session with the communication device 11 is inputted, the communication device 12 may transmit an establishment response packet to the communication device 13. The establishment response packet may notify the approval for initiation of a session. After transmitting the establishment request packet at step S11, the communication device 13 may monitor the receipt of the establishment response packet at step S13. When the establishment response packet is not received, e.g., NO at step 13, the communication device 13 may continue to monitor the receipt of the establishment response packet. When the establishment response packet is received, e.g., YES at step S13, the session with the communication device 12 may be established at step S14.

In order that the communication device 13 may transmit a data packet to the communication device 12 through the session established at the step S14, the available bandwidth may be measured in advance. The available bandwidth may be measured in the communication line directed from the communication device 13 to the communication device 12. The communication device 13 may make the transmission bandwidth of the data packet to be transmitted to the communication device 12 less than the available bandwidth, in order to suppress the packet loss and jitter in the communication. The communication device 13 may determine the transmission bandwidth of the measurement packets and may perform the measurement communication. The communication device 13 may accurately measure the available bandwidth through the measurement communication without affecting the communication between the communication devices 11 and 12.

The communication device 13 may transmit a request packet to the communication device 12 to request the ID of the communication devices 11 that have already established the session with the communication device 12. The communication device 12 may return a packet containing the ID of the communication device 11 to the communication device 13. When the session between the communication devices 11 and 12 is already discontinued and no other communication device 10 has established a session with the communication device 12, the communication device 12 may return a packet containing the ID of the communication device 12 to the communication device 13. The communication device 13 may receive the packet transmitted from the communication device 12 and acquire the ID at step S15.

At step S17, The communication device 13 may decide whether the communication device 12 has established a session with other communication device 10 besides the communication device 13 based on the ID acquired at the step S15. The communication device 13 may decide whether the communication device 12, with which the session has been established at the step S14, has established a session with any of the other communication devices 10. When the session between the communication devices 11 and 12 is already established, the communication device 13 may acquire the ID of the communication device 12 at the step S15. The communication device 13 may decide that none of the other communication devices 10 has established a session with the communication device 12, e.g., NO at step S17. The communication device 13 may designates bmax, as shown in FIG. 2, as the starting bandwidth to perform the measurement communication utilizing the bandwidth of the predetermined range 37 as the transmission bandwidth at step S21. The operation then may proceed to the step S23.

On the other hand, when the session between the communication devices 11 and 12 is effectively established, the communication device 13 may acquire the ID of the communication device 11 at the step S15. Accordingly, the communication device 13 may decide that the communication device 12 has established a session with the communication device 11, e.g., YES at step S17. At step S19, the communication device 13 then may perform a condition determination procedure, as shown in FIG. 8, to determine the transmission bandwidth of the measurement packets based on the communication status between the communication devices 11 and 12.

Figure 8:
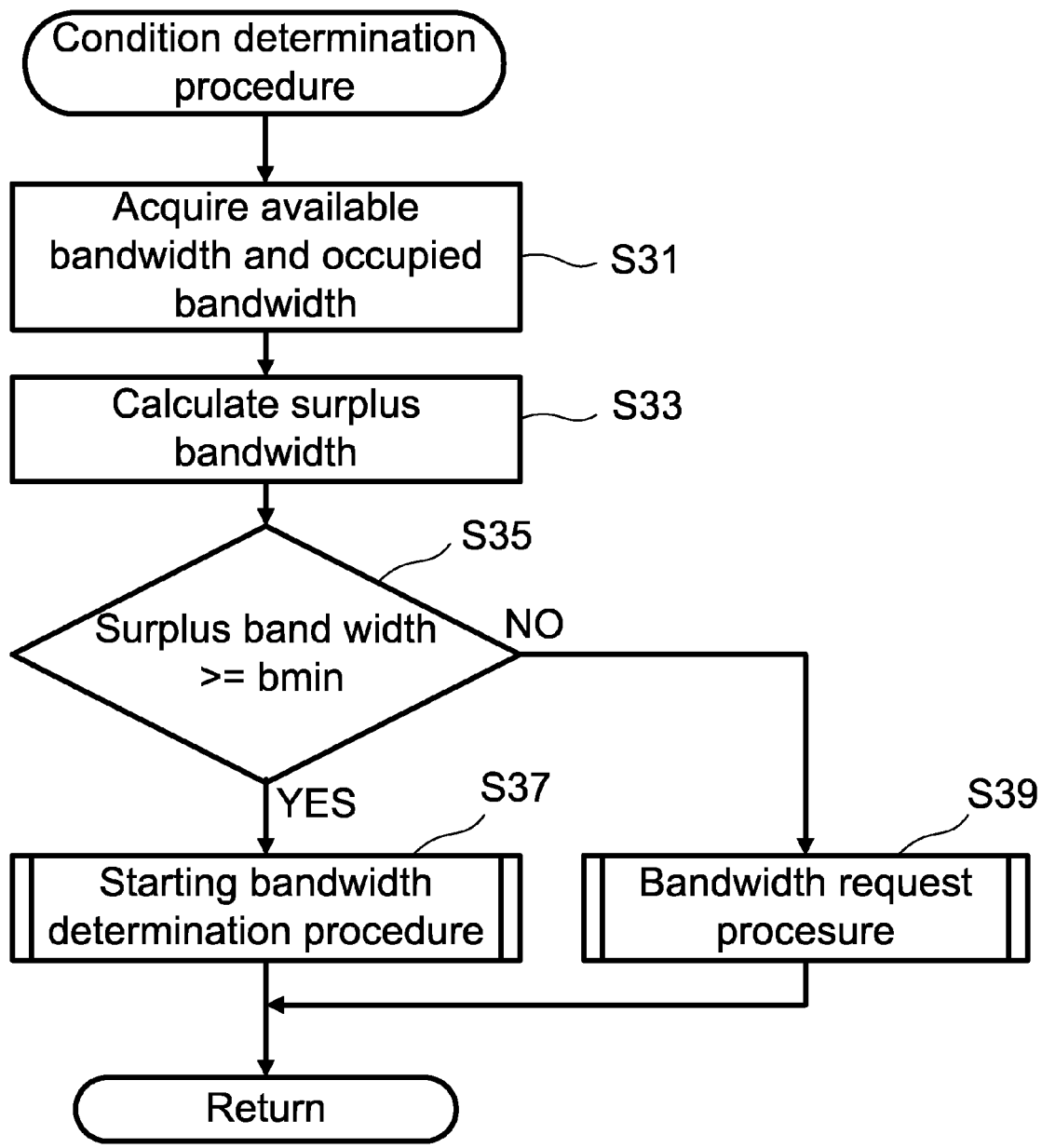
FIG. 8 is a flowchart depicting a condition determination procedure according to an embodiment of the invention.

Referring to FIG. 8, in the condition determination procedure, the communication device 13 may transmit a request packet to the communication device 12 to request the following information representing the communication status between the communication devices 11 and 12: First, the available bandwidth in the communication line directed from the communication device 11 to the communication device 12; and second, the transmission bandwidth of the data packet being transmitted from the communication device 11 to the communication device 12, e.g., occupied bandwidth.

The communication device 12 may return a packet containing the foregoing information, to the communication device 13. At step S31, the communication device 13 may receive the packet transmitted from the communication device 12, and acquire the communication status between the communication devices 11 and 12.

Figure 9:
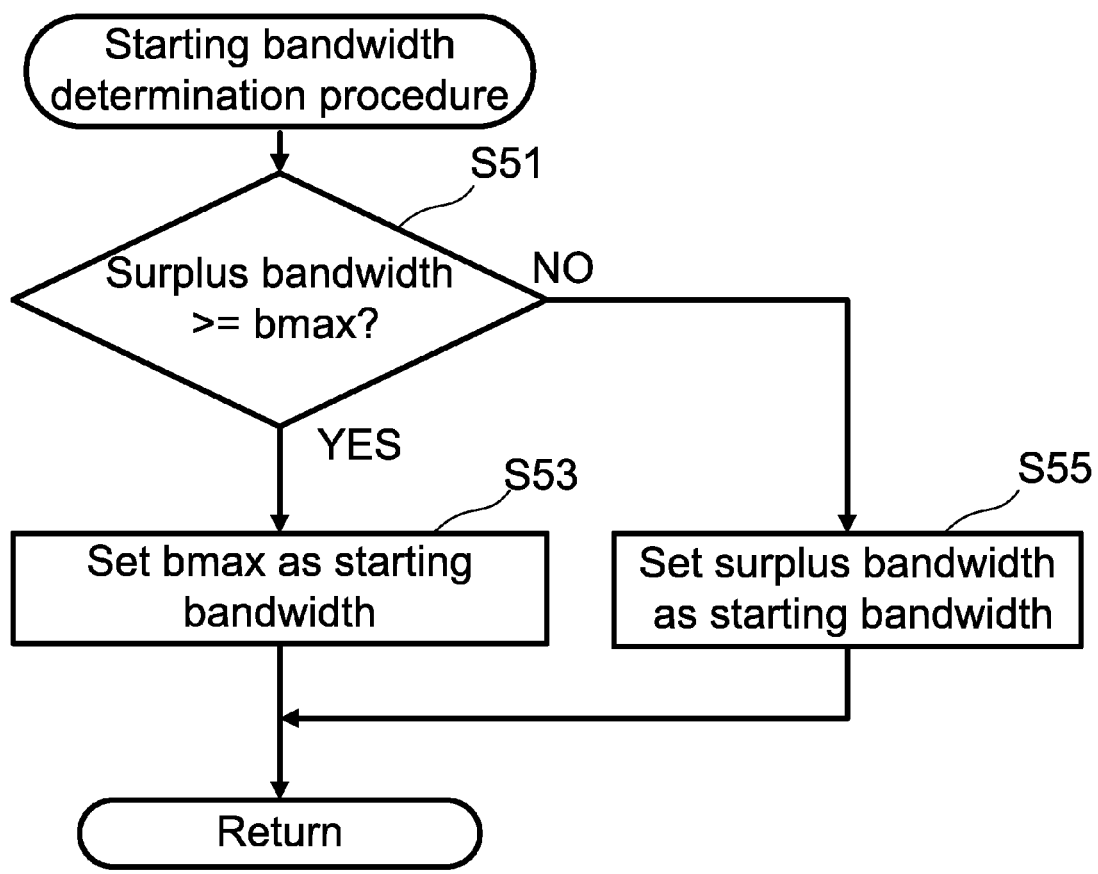
FIG. 9 is a flowchart depicting a starting bandwidth determination procedure according to an embodiment of the invention.

At step S33, the communication device 13 may calculate the surplus bandwidth by subtracting the occupied bandwidth acquired at the step S31 from the available bandwidth acquired at the step S31. At step S35, the communication device 13 may compare the surplus bandwidth with the lower limit bmin of the predetermined range 37, as shown in FIG. 2, to decide whether the surplus bandwidth is larger than bmin. When the surplus bandwidth is equal to or greater than bmin, e.g., YES at S35, the surplus bandwidth and the predetermined range 37 may be in a relationship depicted in FIG. 3 or FIG. 4. At step S37, the communication device 13 may perform the starting bandwidth determination procedure, as shown in FIG. 9, in order to determine the starting bandwidth. After the starting bandwidth is determined in the starting bandwidth determination procedure, the condition determination procedure may end, and the operation may return to the main procedure, as shown in FIG. 7.

Figure 10:
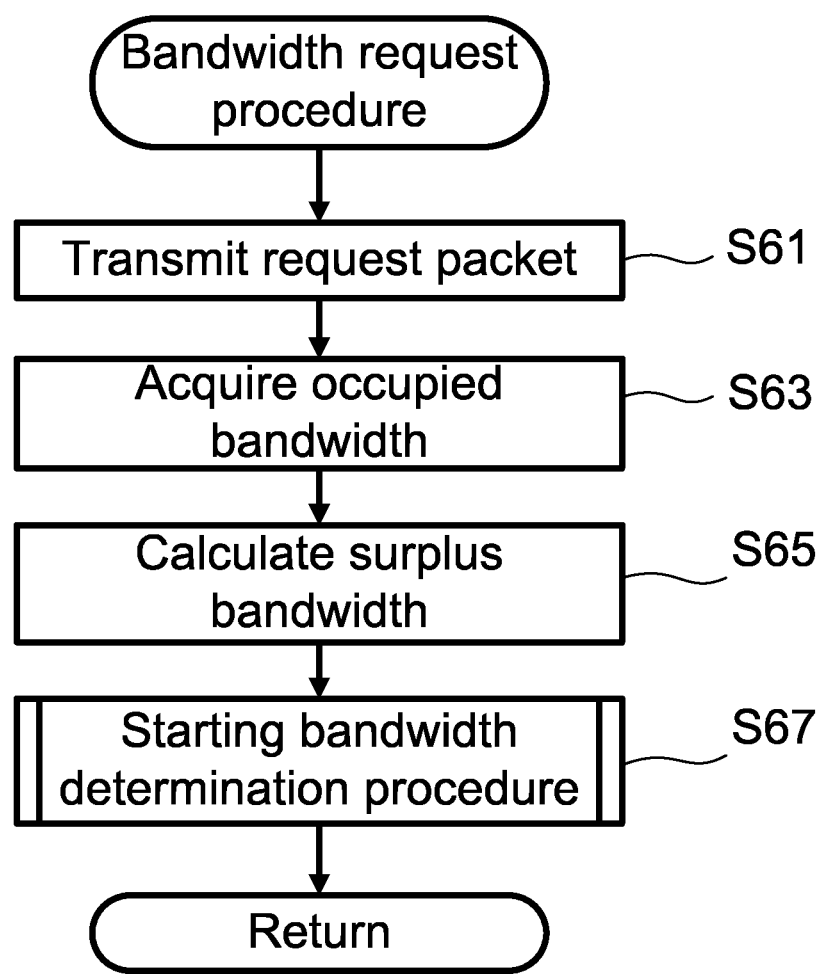
FIG. 10 is a flowchart depicting a bandwidth request procedure according to an embodiment of the invention.

On the other hand, when the surplus bandwidth is less than bmin, e.g., NO at step S35, the surplus bandwidth and the predetermined range 37 may be in a relationship as depicted in FIG. 5. At step S39, the communication device 13 may perform a bandwidth request procedure, as shown in FIG. 10, to determine the starting bandwidth. After the starting bandwidth is determined in the bandwidth request procedure, the condition determination procedure may end, and the operation may return to the main procedure, as shown in FIG. 7.

Referring FIG. 9, in the starting bandwidth determination procedure, the communication device 13 may compare the surplus bandwidth calculated at the step S33, as shown in FIG. 8, with the upper limit bmax of the predetermined range 37, as shown in FIG. 2, to decide whether the surplus bandwidth is equal to or greater than bmax at step S51. When the surplus bandwidth is equal to or greater than bmax, e.g., YES at step S51, the surplus bandwidth and the predetermined range 37 may be in a relationship as depicted in FIG. 3. At step S53, the communication device 13 may designate bmax as the starting bandwidth. The starting bandwidth determination procedure then may end, and the operation may return to the condition determination procedure, as shown in FIG. 8. On the other hand, when the surplus bandwidth is less than bmax, e.g., NO at step S51, the surplus bandwidth and the predetermined range 37 may be in a relationship as depicted in FIG. 4. At step S55, the communication device 13 may designate the surplus bandwidth as the starting bandwidth. The starting bandwidth determination procedure then may end, and the operation may return to the condition determination procedure, as shown in FIG. 8.

Referring to FIG. 10, in the bandwidth request procedure, the communication device 13 may determine the communication device 11 designated by the ID acquired at the step S15, as shown in FIG. 7, as the communication device that has established a session with the communication device 12, and may transmit a request packet to the communication device 12 at step S61. The request packet may serve to request reduction of the transmission bandwidth used for transmitting a data packet from the communication device 11 to the communication device 12. Upon receipt of the request packet, the communication device 12 may transfer the request packet to the communication device 11. When receipt of the request packet from the communication device 12, the communication device 11 may reduce the transmission bandwidth of the data packet being transmitted to the communication device 12, in accordance with the request.

After the transmission bandwidth of the data packet being transmitted from the communication device 11 to the communication device 12 is reduced, the communication device 13 may transmit a request packet to the communication device 12 to request the reduced transmission bandwidth. The communication device 12 may return a packet containing the transmission bandwidth to the communication device 13. At step S63, the communication device 13 may receive the packet transmitted from the communication device 12 and may acquire the transmission bandwidth provided after the reduction of the transmission bandwidth used for transmitting a data packet from the communication device 11 to the communication device 12, as the occupied bandwidth.

At step S65, the communication device 13 may calculate the surplus bandwidth by subtracting the occupied bandwidth acquired at the step S63 from the available bandwidth acquired at the step S31 in FIG. 8. The transmission bandwidth used for transmitting a data packet from the communication device 11 to the communication device 12 may be reduced. Accordingly, the surplus bandwidth calculated at the step S65 may become greater than the surplus bandwidth calculated at the step S33 in FIG. 8. At step S67, the communication device 13 may perform the starting bandwidth determination procedure, as shown in FIG. 9, so as to determine the starting bandwidth based on the calculated surplus bandwidth. The starting bandwidth determination procedure at step S67 may be substantially similar to the starting bandwidth determination procedure at step S37 in FIG. 8. After the starting bandwidth is determined in the starting bandwidth determination procedure, the bandwidth request procedure may end and the operation may return to the condition determination procedure in FIG. 8.

As shown in FIG. 7, after the starting bandwidth is determined either at the step S19 or step S21, the communication device 13 may start the measurement communication using the determined starting bandwidth at step S23. In the measurement communication, the communication device 13 may vary the transmission bandwidth between the starting bandwidth and bmin for transmission of the measurement packets to the communication device 12. When the communication device 12 decides that the available bandwidth is located on the broader side from the starting bandwidth, the communication device 12 may request the communication device 13 to transmit the measurement packets using a bandwidth on the broader side from the starting bandwidth. When such a request is accepted, the communication device 13 may use the bandwidth on the broader side from the starting bandwidth as the transmission bandwidth for transmitting the measurement packets to the communication device 12. Accordingly, the transmission bandwidths for transmitting the measurement packets to the communication device 12 may sequentially be determined.

The transmission bandwidth of the data packet transmitted from the communication device 11 to the communication device 12 may increase during the measurement communication. In this case, the bandwidth used in the communication line directed from the communication device 11 to the communication device 12 and in the communication line directed from the communication device 13 to the communication device 12 may exceed the available bandwidth U. When the available bandwidth U is exceeded, the communication device 12 may suffer greater packet loss and jitter with respect to the data packet received from the communication device 11. Accordingly, the communication device 13 may adjust the transmission bandwidth of the measurement packets transmitted to the communication device 12. The following procedure may suppress the increase in packet loss and jitter between the communication devices 11 and 12, thereby securing the reliability of the communication between the communication devices 11 and 12.

Figure 11:
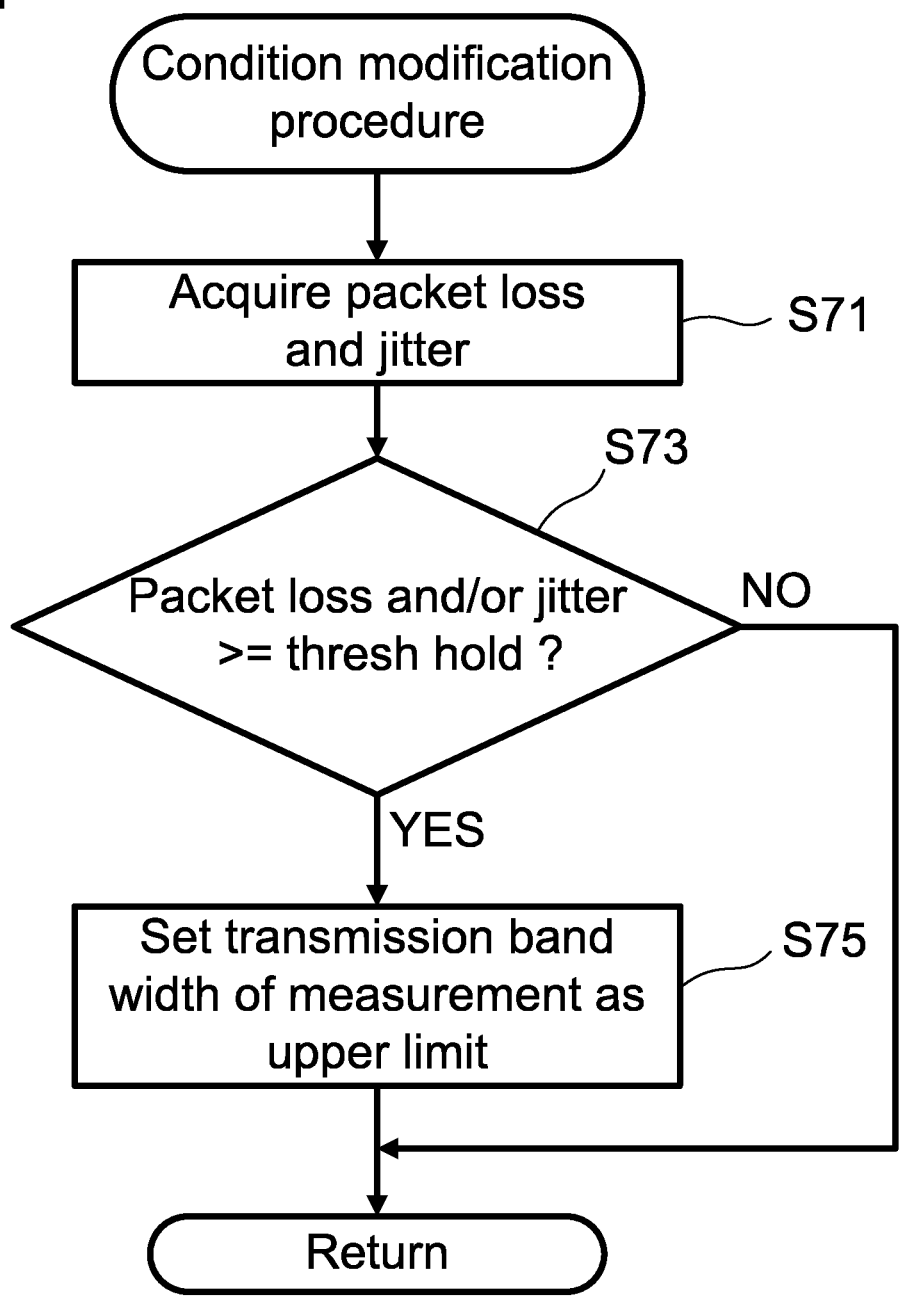
FIG. 11 is a flowchart depicting a condition modification procedure according to an embodiment of the invention.

After the measurement communication with the communication device 12 is started at step S23, the communication device 13 may perform a condition modification procedure at step S25, as shown in FIG. 11. In the condition modification procedure, the transmission bandwidth of the measurement packets may be adjusted in accordance with the communication status between the communication devices 11 and 12. Referring to FIG. 11, the communication device 12 may measure the packet loss and jitter at the same time as receiving the data packet transmitted from the communication device 11. The communication device 13 may transmit a request packet to the communication device 12 to request the packet loss or jitter, or both, measured by the communication device 12. The communication device 12 may return a packet containing the measured packet loss or jitter, or both, to the communication device 13. Upon receipt of the packet transmitted from the communication device 12, the communication device 13 may acquire the packet loss or jitter at step S71.

The communication device 13 may decide whether the acquired packet loss or jitter, or both, is equal to or greater than a predetermined threshold at step S73. When the acquired packet loss or jitter, or both, is equal to or greater than the predetermined threshold, e.g., YES at step S73, the bandwidth used in the communication line directed from the communication device 11 to the communication device 12 may exceed the available bandwidth U. In this case, the transmission bandwidth of the measurement packets may be reduced to prevent the communication status from degrading. Accordingly, at step S75, the transmission bandwidth of the measurement packets transmitted to the communication device 12 may be designated as the upper limit of the transmission bandwidth of the measurement packets, when the communication device 13 decides that the acquired packet loss or jitter, or both, is equal to or greater than the predetermined threshold. Thereafter, the transmission bandwidth may be determined so as not to exceed the upper limit set as above, for transmission of the measurement packets. Thus, the transmission bandwidth of the measurement packets may be prevented from increasing. The condition modification procedure may end, and the operation may return to the main procedure in FIG. 7.

On the other hand, when the packet loss or jitter, or both, acquired at the step S71 is less than the predetermined threshold, e.g., NO at step S73, it may not be necessary to determine the upper limit of the transmission bandwidth. Accordingly, the condition modification procedure may end, and the operation may return to the main procedure in FIG. 7.

The communication device 12 may receive the measurement packets and measure the packet loss and jitter. When the available bandwidth is determined, the communication device 12 may provide the identified available bandwidth to the communication device 13. Upon receipt of the notification of the available bandwidth, the communication device 13 may decide that the measurement communication has ended, e.g., YES at step S27. At this stage, the main procedure may end. When the available bandwidth has not been notified, e.g., NO at step S27, the operation may return to step S25, so that the measurement communication and the condition modification procedure may continuously be performed.

The communication device 11 may establish a session with the communication device 12. In another embodiment, the communication device 12 may establish sessions with two or more of the communication device 10.

In this case, the communication device 13 may calculate a mean value of the available bandwidth of a plurality of communication lines directed to the communication device 12 from two or more communication devices 10 that have established sessions with the communication device 12. The communication device 13 may also calculate the total of the transmission bandwidth of a plurality of data packets being transmitted to the communication device 12, as the occupied bandwidth. Thus, the communication device 13 may calculate the surplus bandwidth by subtracting the summed occupied bandwidth from the mean value of the available bandwidth.

The communication device 13 may calculate the surplus bandwidth based on the available bandwidth and the occupied bandwidth acquired from the communication device 12. In another embodiment, the communication device 12 may calculate the occupied bandwidth. The communication device 13 may acquire the surplus bandwidth calculated by the communication device 12 directly from the communication device 12.

The communication device 13 may transmit the request packet to the communication device 12 to acquire the available bandwidth and the occupied bandwidth. In another embodiment, the communication device 13 may transmit the request packet to the communication device 11 to acquire the available bandwidth and the occupied bandwidth from the communication device 11.

The communication device 13 may transmit, to the communication device 12, the request packet requesting the reduction of the transmission bandwidth of the data packet being transmitted from the communication device 11 to the communication device 12. The communication device 12 then may transfer the request packet to the communication device 11, such that the communication device 11 may reduce the transmission bandwidth of the data packet. In another embodiment, the communication device 13 may transmit the request packet directly to the communication device 11, such that the communication device 11 may reduce the transmission bandwidth of the data packet being transmitted to the communication device 12.

The communication device 13 may determine the upper limit of the transmission bandwidth of the measurement packets, when the packet loss and jitter acquired from the communication device 12 are equal to or greater than a predetermined threshold. In another embodiment, the communication device 13 may acquire at least either of the packet loss and the jitter. The communication device 13 may determine the upper limit of the transmission bandwidth of the measurement packets, when at least either of the packet loss or the jitter is equal to or greater than a predetermined threshold.

According to FIG. 5, the transmission bandwidth of the data packet being transmitted from the communication device 11 to the communication device 12 may be reduced when the calculated surplus bandwidth is less than the lower limit bmin of the predetermined range 37. In another embodiment, the transmission bandwidth of the data packet being transmitted from the communication device 11 to the communication device 12 may be reduced, for example, when the calculated surplus bandwidth is less than a predetermined threshold. Therefore, the transmission bandwidth of measurement data that may be selected for the measurement communication may be varied in a wider range. Such an arrangement further assures that the communication device 13 may detect the available bandwidth consistently.

Referring to FIG. 3, bmax may be designated as the starting bandwidth. In another embodiment, any bandwidth between bmin and bmax may be designated as the starting bandwidth. Referring to FIG. 4, the surplus bandwidth X may be designated as the starting bandwidth. In another embodiment, any bandwidth between bmin and the surplus bandwidth X may be designated as the starting bandwidth. When the surplus bandwidth Y is calculated, as shown in FIG. 5, the communication device 13 may request the communication device 11 to reduce the transmission bandwidth of the data packet indicating an extent of reduction of the transmission bandwidth.

While the invention has been described in connection with various exemplary structures and illustrative embodiments, it will be understood by those skilled in the art that other variations and modifications of the structures, configurations, and embodiments described above may be made without departing from the scope of the invention. For example, this application may comprise many possible combinations of the various elements and features disclosed herein, and the particular elements and features presented in the claims and disclosed above may be combined with each other in other ways within the scope of the application, such that the application should be recognized as also directed to other embodiments comprising any other possible combinations. Other structures, configurations, and embodiments will be apparent to those skilled in the art from a consideration of the specification or practice of the invention disclosed herein. It is intended that the specification and the described examples are illustrative with the true scope of the invention being defined by the following claims.

What is claimed is:

1. A first communication device comprising: a memory storing a communication program,
   a controller configured to access the communication program and configured to control the first communication device to execute the steps of:
      establishing communication between the first communication device and a second communication device via a first communication session, wherein the second communication device is different from the first communication device;
      determining whether a second communication session between the second communication device and a third communication device is established, wherein the third communication device is different from the first and second communication devices;
      acquiring a communication parameter of the second communication session from the second communication device when the controller determines that the second communication session is established;
      measuring an available bandwidth in the first communication session based on the acquired communication parameter of the second communication session; and
      communicating with the second communication device using the first communication session after setting the bandwidth,
      wherein the step of acquiring the communication parameter comprises the step of acquiring a surplus bandwidth of the second communication device, the surplus bandwidth being defined by subtracting a bandwidth of the second communication session from an available bandwidth of the second communication device, and the bandwidth of the second communication session is a bandwidth occupied by a communication between the second communication device and the third communication device,
      wherein the step of measuring the available bandwidth of the first communication session comprises the steps of:
         determining whether an upper limit of a predetermined range is equal to or less than the surplus bandwidth;
         setting a starting bandwidth of the measurement of the available bandwidth in the first communication session to be:
            the upper limit of the predetermined range when the upper limit of the predetermined range is equal to or less than the surplus bandwidth; and
            the surplus bandwidth when the upper limit of the predetermined range is more than the surplus bandwidth; and
         transmitting a measure data for measuring the available bandwidth of the first communication session to the second communication device using a transmission bandwidth, which is gradually varied within a range starting from the starting bandwidth.

2. The first communication device according to claim 1, wherein the communication parameter of the second communication session comprises a bandwidth of the second communication session,
   wherein the step of determining the starting bandwidth comprises the step of determining a surplus bandwidth by subtracting the bandwidth of the second communication session from an available bandwidth of the first communication device,
   wherein the bandwidth of second communication session is a bandwidth occupied by a communication between the first communication device and the second communication device,
   wherein the starting bandwidth is equal to or less than the surplus bandwidth.

3. The first communication device according to claim 1,
   wherein the step of determining the starting bandwidth comprises the step of determining whether an upper limit of the predetermined range is equal to or less than the surplus bandwidth;
   wherein the step of setting the bandwidth of the first communication session comprises the step of transmitting the measure data to the first communication device using the transmission bandwidth, which is gradually varied within the predetermined range starting from the upper limit of the predetermined range when the upper limit of the predetermined range is equal to or less than the surplus bandwidth.

4. The first communication device according to claim 1,
   wherein the step of determining the starting bandwidth comprises the step of determining whether an upper limit of the predetermined range is greater than the surplus bandwidth;
   wherein the step of setting the bandwidth of the first communication session comprises the step of transmitting the measure data to the first communication device using the transmission bandwidth, which is gradually varied starting from the surplus bandwidth when the upper limit of the predetermined range is more than the surplus bandwidth.

5. The first communication device according to claim 3, wherein when the computer-readable instructions are executed by the controller, the controller is further configured to execute the steps of:
   determining whether the surplus bandwidth is less than a lower limit of the predetermined range; and
   reducing a volume of communication between the first communication device and the second communication device when the surplus bandwidth is less than the lower limit of the predetermined range, such that the surplus bandwidth is within the predetermined range.

6. The first communication device according to claim 1, wherein when the computer-readable instructions are executed by the controller, the controller is further configured to execute the steps of:
   acquiring a number of data lost or jitter in the second communication session;
   decreasing an upper limit of the predetermined range when the number of data lost or jitter in the second communication session is equal to or greater than a predetermined value.

7. A method for implementing communication at a first communication device, the method comprising steps of:
   establishing communication between the first communication device and a second communication device via a first communication session, wherein the second communication device is different from the first communication device;
   determining whether a second communication session between the second communication device and a third communication device is established, wherein the third communication device is different from the first and second communication devices;

acquiring a communication parameter of the second communication session from the second communication device when the second communication session is established;

measuring an available bandwidth in the first communication session based on the acquired communication parameter of the second communication session; and communicating with the second communication device using the first communication session after setting the bandwidth, wherein the step of acquiring the communication parameter comprises the step of acquiring a surplus bandwidth of the second communication device, the surplus bandwidth being defined by subtracting a bandwidth of the second communication session from an available bandwidth of the second communication device, and the bandwidth of the second communication session is a bandwidth occupied by a communication between the second communication device and the third communication device, wherein the step of measuring the available bandwidth of the first communication session comprises the steps of:
 determining whether an upper limit of a predetermined range is equal to or less than the surplus bandwidth;
 setting a starting bandwidth of the measurement of the available bandwidth in the first communication session to be:
  the upper limit of the predetermined range when the upper limit of the predetermined range is equal to or less than the surplus bandwidth; and
  the surplus bandwidth when the upper limit of the predetermined range is more than the surplus bandwidth; and
 transmitting a measure data for measuring the available bandwidth of the first communication session to the second communication device using a transmission bandwidth, which is gradually varied within a range starting from the starting bandwidth.

8. A non-transitory computer readable storage medium storing computer readable instructions that, when executed, cause a first communication device to execute steps of:

establishing communication between the first communication device and a second communication device via a first communication session, wherein the second communication device is different from the first communication device;

determining whether a second communication session between the second communication device and a third communication device is established, wherein the third communication device is different from the first and second communication devices;

acquiring a communication parameter of the second communication session from the second communication device when the second communication session is established;

measuring an available bandwidth in the first communication session based on the acquired communication parameter of the second communication session; and communicating with the second communication device using the first communication session after setting the bandwidth, wherein the step of acquiring the communication parameter comprises the step of acquiring a surplus bandwidth of the second communication device, the surplus bandwidth being defined by subtracting a bandwidth of the second communication session from an available bandwidth of the second communication device, and the bandwidth of the second communication session is a bandwidth occupied by a communication between the second communication device and the third communication device, wherein the step of measuring the available bandwidth of the first communication session comprises the steps of:
 determining whether an upper limit of a predetermined range is equal to or less than the surplus bandwidth;
 setting a starting bandwidth of the measurement of the available bandwidth in the first communication session to be:
  the upper limit of the predetermined range when the upper limit of the predetermined range is equal to or less than the surplus bandwidth; and
  the surplus bandwidth when the upper limit of the predetermined range is more than the surplus bandwidth; and
 transmitting a measure data for measuring the available bandwidth of the first communication session to the second communication device using a transmission bandwidth, which is gradually varied within a range starting from the starting bandwidth.

* * * * *